United States Patent
Veilleux, Jr. et al.

(10) Patent No.: US 9,091,212 B2
(45) Date of Patent: Jul. 28, 2015

(54) FUEL AND ACTUATION SYSTEM FOR GAS TURBINE ENGINE

(71) Applicant: Hamilton Sundstrand Corporation, Windsor Locks, CT (US)

(72) Inventors: Leo J. Veilleux, Jr., Wethersfield, CT (US); Gary M. McBrien, South Glastonbury, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 131 days.

(21) Appl. No.: 13/851,580

(22) Filed: Mar. 27, 2013

(65) Prior Publication Data

US 2014/0290266 A1 Oct. 2, 2014

(51) Int. Cl.
*F02C 9/26* (2006.01)
*F02C 7/236* (2006.01)
*F01D 17/10* (2006.01)

(52) U.S. Cl.
CPC ............... *F02C 9/263* (2013.01); *F01D 17/10* (2013.01); *F02C 7/236* (2013.01)

(58) Field of Classification Search
CPC ........... F02C 27/236; F02C 9/16; F02C 7/22; F02C 7/232; F02C 9/263; F02C 7/236; F05D 2270/64; F01D 17/10
USPC .................. 60/734, 266, 267, 39.08
See application file for complete search history.

(56) References Cited

U.S. PATENT DOCUMENTS

| | | | |
|---|---|---|---|
| 3,275,061 A * | 9/1966 | Williams et al. ............... | 137/263 |
| 3,279,522 A * | 10/1966 | Norris et al. .................... | 137/256 |
| 4,069,662 A | 1/1978 | Redinger, Jr. et al. | |
| 4,304,093 A | 12/1981 | Schulze | |
| 4,338,061 A | 7/1982 | Beitler et al. | |
| 4,487,016 A | 12/1984 | Schwarz et al. | |
| 5,116,362 A * | 5/1992 | Arline et al. ..................... | 60/734 |
| 6,487,847 B1 * | 12/2002 | Snow et al. ..................... | 60/235 |
| 6,651,441 B2 | 11/2003 | Reuter et al. | |
| 7,216,487 B2 * | 5/2007 | Parsons .......................... | 60/773 |
| 7,950,232 B2 | 5/2011 | Galozio et al. | |
| 2003/0074884 A1 | 4/2003 | Snow et al. | |
| 2003/0136103 A1 * | 7/2003 | Reuter et al. .................. | 60/39.08 |
| 2004/0011052 A1 * | 1/2004 | Clements ........................ | 60/773 |
| 2005/0050897 A1 | 3/2005 | Lewis | |
| 2005/0279079 A1 * | 12/2005 | Baryshnikov et al. ..... | 60/39.094 |

(Continued)

FOREIGN PATENT DOCUMENTS

EP 1329617 A2 7/2003

OTHER PUBLICATIONS

European Patent Office, European Search Report, Mar. 30, 2015, 6 pages.

*Primary Examiner* — Phutthiwat Wongwian
*Assistant Examiner* — Scott Walthour
(74) *Attorney, Agent, or Firm* — Kinney & Lange, P.A.

(57) ABSTRACT

A fuel system for an aircraft comprises a boost pump, a main fuel pump and a motive pump. The boost pump receives fuel from a storage unit. The main fuel pump receives fuel from the boost pump and delivers fuel to a distribution system. The motive fuel pump receives fuel from the boost pump, routes fuel through the storage unit, and delivers fuel to an actuator. A method for delivering fuel in an aircraft comprises pumping fuel from a fuel tank to a distribution system using a main pump, pumping fuel from a fuel tank to an actuator using a motive pump, and routing fuel from the actuator to the main pump.

20 Claims, 1 Drawing Sheet

(56) References Cited

U.S. PATENT DOCUMENTS

| | | |
|---|---|---|
| 2006/0150631 A1* | 7/2006 | Smith et al. ............... 60/772 |
| 2007/0089395 A1 | 4/2007 | Fujii et al. |
| 2009/0199823 A1* | 8/2009 | Mahoney et al. ......... 123/497 |
| 2009/0211558 A1* | 8/2009 | Anson et al. ............. 123/497 |
| 2010/0263634 A1 | 10/2010 | Futa, Jr. et al. |
| 2012/0073301 A1 | 3/2012 | Paradise |
| 2012/0234015 A1 | 9/2012 | Reuter |
| 2012/0271527 A1 | 10/2012 | Zebrowski et al. |

* cited by examiner

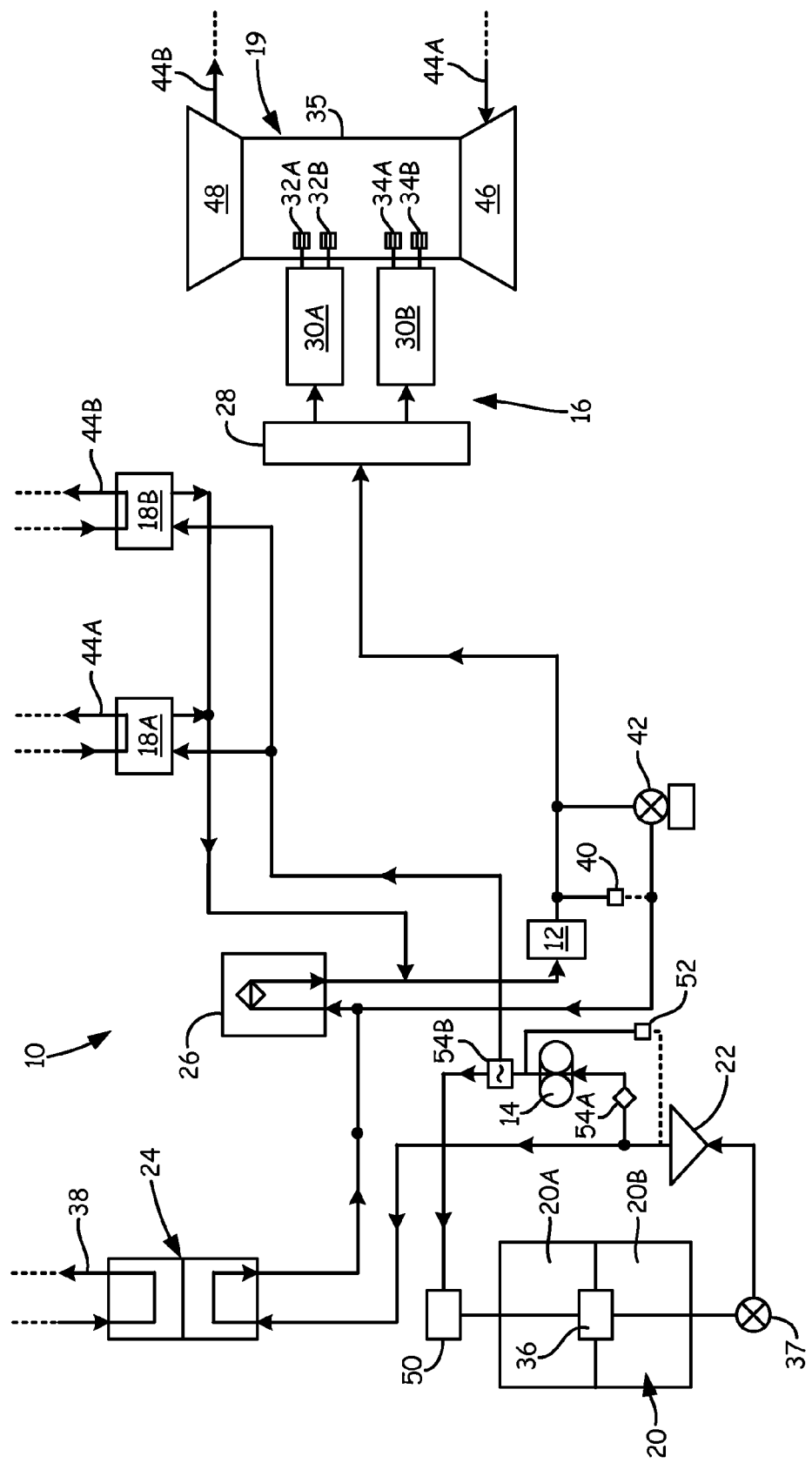

FUEL AND ACTUATION SYSTEM FOR GAS TURBINE ENGINE

BACKGROUND

The present disclosure relates generally to fuel systems for gas turbine engines. In particular, the present disclosure relates to fuel systems utilizing fuel flow to operate engine actuation systems.

In conventional fuel systems, a main fuel pump is used to deliver fuel to a fuel metering valve that provides fuel directly to fuel injectors in the combustion section of the engine. Additionally, some of the fuel flow from the main fuel pump is circulated through actuators that operate other engine or aircraft systems. Such a system is described in U.S. Pat. No. 4,487,016, which is assigned to United Technologies Corporation. In some systems, fuel flow is metered using a servo valve-controlled torque motor that provides fuel based on engine requirements for different speeds. Additionally, servo valve-controlled valves are used to regulate airflow to active clearance control systems and variable vane systems based on fuel flow. The servo valves utilize fuel flow from the main fuel pump to provide actuation. The main fuel pump needs to be sized at a minimum to provide flow to the servo valves and to the injectors at idle engine speed, and at a maximum to provide flow to the servo valves and to the injectors under transient engine conditions, such as during take-off. Thus, the main fuel pump must have a large capacity to accommodate the entire engine operating envelope and to provide fuel to other various aircraft systems. The large pump capacity produces inefficiencies in the engine, such as consuming excess system horsepower and generating waste heat. Furthermore, the servo valve-controlled actuators need to be sized to withstand the elevated pressures generated during transient conditions and the associated fatigue stress with such a wide operating envelope. There is, therefore, a need for a more efficient fuel and actuation system for gas turbine engines.

SUMMARY

The present disclosure is directed to systems and methods for delivering fuel in an aircraft. In one embodiment, a fuel system for an aircraft comprises a boost pump, a main fuel pump and a motive pump. The boost pump receives fuel from a storage unit. The main fuel pump receives fuel from the boost pump and delivers fuel to a distribution system. The motive fuel pump receives fuel from the boost pump, routes fuel through the storage unit, and delivers fuel to an actuator.

In another embodiment, the present disclosure is directed to a method for delivering fuel in an aircraft. The method comprises pumping fuel from a fuel tank to a distribution system using a main pump, and pumping fuel from a fuel tank to an actuator using a motive pump. The method also comprises routing fuel from the actuator to the main pump.

BRIEF DESCRIPTION OF THE DRAWINGS

The sole FIGURE shows a fuel and actuation system utilizing a main fuel pump and a motive fuel pump to deliver fuel flows to a combustion system and to actuators.

DETAILED DESCRIPTION

The sole FIGURE shows fuel and actuation system 10 utilizing main fuel pump 12 and motive fuel pump 14 to deliver fuel flows to distribution system 16 and actuators 18A and 18B. The present disclosure is described with reference to a fuel system for gas turbine engine 19 that utilizes fuel flow to operate aircraft system actuators. However, the fuel and actuation system described herein may be used with other aircraft or non-aircraft systems.

Fuel located in a storage unit, such as fuel tank 20, is pumped out by boost pump 22. Boost pump 22 provides fuel flow to main fuel pump 12 and motive pump 14. Heat exchanger 24 and filter 26 are fluidly positioned between boost pump 22 and main fuel pump 12 in series connection. Main fuel pump 12 delivers fuel to distribution system 16, which comprises manifold 28, valves 30A and 30B, and injectors 32A, 32B, 34A and 34B. Main fuel pump 12, through distribution system 16, provides fuel to combustor 35 in gas turbine engine 19 where a combustion process that consumes fuel occurs. Motive pump 14 provides fuel to ejector 36 to circulate or distribute fuel within fuel tank 20, and also provides fuel to actuators 18A and 18B to control various operations related to gas turbine engine 19. Main fuel pump 12 and motive pump 14 are mechanically operated based on shaft speed within gas turbine engine 19. Thus, at higher shaft speeds, pumps 12 and 14 provide higher volumetric flow rates of fuel.

Boost pump 22 draws in fuel from fuel tank 20 through shut-off valve 37 and pumps the fuel to heat exchanger 24. Heat exchanger 24 is fluidly coupled to fluid flow 38 of another liquid, such as oil or another lubricant, that is at a different temperature than the fuel from boost pump 22. In one embodiment, heat exchanger 24 comprises a fuel/oil cooler that transfers heat from oil used to lubricate various aircraft systems, such as bearings, to the fuel. From heat exchanger 24, fuel is routed to filter 26. Main fuel pump 12 provides fuel to distribution system 16, which includes many small orifices, such as those in injectors 32A-34B. Filter 26 removes contaminants from the fuel before being routed to main fuel pump 12 to avoid formation of blockages within main fuel pump 12 and distribution system 16. In one embodiment, filter 26 comprises a screen with a bypass valve.

Main fuel pump 12 provides fuel directly to manifold 28, which distributes fuel to a plurality of valves. Fuel valves 30A and 30B distribute fuel to fuel injectors 32A-34B as needed by gas turbine engine 19. In particular, injectors 32A-34B provide fuel to combustor 35 within gas turbine engine 19 where combustion process is executed using the fuel. The combustion process, as is known in the art, operates gas turbine engine 19 to provide shaft power or thrust that drives an aircraft. In one embodiment of the invention, valves 30A and 30B are electronically operated metering valves controlled by a control system for gas turbine engine 19. Injectors 32A-34B may comprise primary and secondary fuel injectors that deliver fuel to different parts of combustor 35 at different times during the combustion process.

Fuel flow from main fuel pump 12 also includes pressure relief valve 40 and pressure regulating valve 42. Pressure relief valve 40 allows fuel from the high pressure side of main fuel pump 12 to be returned to the low pressure side of main fuel pump 12, such as at the inlet of filter 26. Pressure relief valve 40 typically automatically opens when pressure at the high pressure side of main fuel pump 12 becomes higher than a system maximum to prevent system over-pressurization.

Pressure regulating valve 42 returns fuel unneeded by distribution system 16 to the low pressure side of main fuel pump 12, such as at the inlet of filter 26. For example, main fuel pump 12 operates to provide a steady flow of fuel to manifold 28 at different operating speeds of gas turbine engine 19. Sometimes, such as during steady state cruise conditions of gas turbine engine 19, main fuel pump 12 can provide more fuel than is needed by combustor 35. In such scenarios, pressure regulating valve 42 returns unconsumed fuel back through fuel system 10. In one embodiment, pressure regulating valve 42 comprises an electronically operated valve, such as a direct drive valve, that is controlled by a control system for gas turbine engine 19. In another embodiment, pressure regulating valve 42 comprises a servo valve that operates based on fuel flow as do actuators 18A and 18B, which will be described in detail below.

In addition to providing burn flow to distribution system 16 and combustor 35 through main fuel pump 12, boost pump 22 also pumps fuel from fuel tank 20 to motive pump 14. Motive pump 14 provides fuel flow to ejector 36, which is used to distribute fuel within fuel tank 20. For example, ejector 36 transfers fuel from different partitions 20A, 20B within fuel tank 20, such as those that are located in different wings of the aircraft. Such distribution and circulation of fuel within fuel tank 20 ensures that boost pump 22 will be adequately primed with fuel at different fuel level and at different aircraft orientations. Fuel from within fuel tank 20 is provided to boost pump 22 through shut-off valve 37. Valve 37 can be closed to fluidly isolate fuel tank 20 from boost pump 22 such as for maintenance operations and the like.

Motive pump 14 additionally directly provides fuel flow to one or more actuators. As mentioned, motive pump 14 may also provide fuel flow to a servo valve for various embodiments of pressure regulating valve 42. In the described embodiment, fuel and actuation system 10 includes two actuators 18A and 18B. In one embodiment, actuators 18A and 18B comprise servo valves that are operated by fuel flow from motive pump 14. In one embodiment, actuators 18A and 18B include butterfly valves that are actuated based on the volume of fuel flow provided by motive pump 14. Actuators 18A and 18B regulate airflows 44A and 44B, respectively, to other parts of gas turbine engine 19. For example, actuator 18A may actuate an active clearance control air valve that provides airflow 44A to change the clearance gap in turbine section 46 of gas turbine engine 19. Such an active clearance control system is described in U.S. Pat. No. 4,069,662 to Redinger, which is assigned to United Technologies Corporation and is incorporated herein by this reference. For example, actuator 18B may actuate a bleed valve that controls bleed airflow 44B from compressor section 48 of gas turbine engine 19 for various uses, such as clearance control systems. In another embodiment, actuators 18A and 18B may comprise a linear actuator that changes the position of a variable vane. In other embodiments, heat exchangers may be connected into system 10 upstream of actuators 18A and 18B to warm the fuel flow before interacting with airflows 44A and 44B. After providing actuation power to actuators 18A and 18B, fuel is returned to fuel and actuation system 10, such as at the inlet of main fuel pump 12.

Motive pump 14 is fluidly connected within fuel and actuation system 10 with check valve 50, pressure relief valve 52, filter 54A and filter 54B. Filters 54A and 54B remove contaminants from the fuel before and after being routed to and from motive pump 14, respectively, to avoid formation of blockage in passages within actuators 18A and 18B or ejector 36. In one embodiment, filter 54A comprises a screen with a bypass valve, and filter 54B comprises a wash filter.

Pressure relief valve 52 allows fuel from the high pressure side of motive pump 14 to be returned to the low pressure side of motive pump 14, such as at the inlet of filter 54A. Pressure relief valve 52 typically automatically opens when pressure at the high pressure side of motive pump 14 becomes higher than a system maximum to prevent system over-pressurization.

Check valve 50 ensures that fuel from motive pump 14 remains above a baseline pressure in the fuel lines. In particular, fuel flow from motive pump 14 is divided between the needs of ejector 36 and actuators 18A and 18B. Ejector 36 is operable over a wide range of system pressures and need not continuously operate. Actuators 18A and 18B, however, require a minimum fuel pressure to be operable and need to operate over the entire operating envelope of gas turbine engine 19. Check valve 50 ensures that flow from motive pump 14 to actuators 18A and 18B is at a minimum pressure to ensure functionality of actuators 18A and 18B. Specifically, check valve 50 establishes a restriction before ejector 36 that maintains a back pressure between motive pump 14 and actuators 18A and 18B. In one embodiment, check valve 50 comprises a minimum pressure valve, as is known in the art. In another embodiment, check valve 50 may comprise a computer controlled valve to modulate the minimum pressure for additional optimization of both pressure and temperature.

In view of the foregoing system, main fuel pump 12 is sized to provide only the fuel flow required by distribution system 16. Typically, actuators within a gas turbine engine can consume 20%-30% of the output of the main fuel pump. Because motive pump 14 feeds actuators 18A and 18B, main fuel pump 12 need not be sized to provide additional fuel flows to actuators 18A and 18B. Furthermore, motive pump 14 need not be increased in capacity to accommodate actuator transients because short reductions in motive flow are acceptable. Thus, main fuel pump 12 can be 20%-30% smaller and lighter. Main fuel pump 12 also does not consume excessive system horsepower, such as by consuming shaft power of gas turbine engine 19, or generate excess system heat, such as by pumping unnecessary volume of fuel through pressure regulating valve 42. Furthermore, by de-coupling fuel flow to actuators 18A and 18B from main fuel pump 12, actuators 18A and 18B and all fuel lines servicing actuators 18A and 18B, can be sized for lower pressures and lower cycle fatigue. Thus, actuators 18A and 18B and their respective fuel lines can be lighter and less expensive. Additionally, by having actuators 18A and 18B powered by motive pump 14, transient disturbance from the actuators of pressure regulating valve 42 is eliminated.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for delivering fuel in an aircraft, the method comprising:
   pumping fuel from a storage unit to a boost pump;
   pumping fuel from the boost pump to a distribution system using a main pump, wherein a first boost pump line fluidly connects an outlet of the boost pump to an inlet of the main pump;
   pumping fuel from the boost pump to an actuator using a motive pump, thereby providing pumped fuel to the actuator, wherein actuation power for the actuator is provided by the pumped fuel, wherein a second boost pump line fluidly connects the outlet of the boost pump to an inlet of the motive pump;
   routing fuel from the actuator to the main pump; and routing fuel from the motive pump to an ejector within the storage unit to circulate fuel within the storage unit.

2. The method of claim 1 and further comprising: routing fuel from the boost pump to the main pump through a fuel/oil heat exchanger.

3. The method of claim 1 and further comprising: routing fuel from the boost pump to the main pump through a filter.

4. The method of claim 1 and further comprising regulating fuel flow from the main pump to the distribution system with a pressure regulating valve that routes fuel to an inlet of the main pump.

5. The method of claim 1 wherein the distribution system comprises:
a fuel manifold that receives fuel from the main pump; and
valves that deliver fuel from the fuel manifold to fuel nozzles for combustion.

6. The method of claim 1 and further comprising pumping a motive flow of fuel to the storage unit using the motive pump.

7. The method of claim 6 and further comprising regulating fuel flow from the motive pump to the actuator using a valve positioned between the storage unit and the motive pump.

8. The method of claim 7 wherein the valve positioned between the storage unit and the motive pump is modulated to control pressure and temperature of fuel flowing therethrough.

9. A fuel system for an aircraft, the fuel system comprising:
a boost pump for receiving fuel from a storage unit;
a main fuel pump that receives fuel from the boost pump and that delivers fuel to a distribution system;
a motive fuel pump that receives fuel from the boost pump, routes fuel through the storage unit, and delivers fuel to provide actuation power for an actuator;
an ejector within the storage unit to circulate fuel within the storage unit, wherein the motive fuel pump delivers fuel to the ejector,
an actuator supply line fluidly connecting the motive fuel pump to an inlet of the actuator; and
an actuator return line fluidly connecting an outlet of the actuator to the main fuel pump.

10. The fuel system of claim 1 and further comprising:
a valve positioned between the ejector and the motive pump to maintain minimum pressure of fuel delivered to the actuator.

11. The fuel system of claim 10 wherein the valve positioned between the ejector and the motive pump is computer controlled.

12. The fuel system of claim 1 wherein the actuator comprises a servo valve that controls airflow through an aircraft system.

13. The fuel system of claim 1 wherein the distribution system comprises:
a fuel manifold that receives fuel from the main fuel pump; and
valves that deliver fuel from the fuel manifold to fuel nozzles.

14. The fuel system of claim 13 and further comprising a pressure regulating valve fluidly positioned between the fuel manifold and the main fuel pump to circulate fuel back to an inlet of the main fuel pump.

15. The fuel system of claim 1 and further comprising:
a fuel/oil heat exchanger positioned between the boost pump and the main pump; and
a fuel filter between the fuel/oil heat exchanger and the main pump.

16. The fuel system of claim 1 and further comprising:
a first boost pump line fluidly connecting an outlet of the boost pump to an inlet of the main fuel pump; and
a second boost pump line fluidly connecting the first boost pump line to an inlet of the motive fuel pump.

17. The fuel system of claim 1, wherein the storage unit has a plurality of partitions, and wherein the ejector circulates fuel between at least two of the plurality of partitions.

18. A gas turbine engine system comprising:
a fuel tank;
a combustor;
an actuator;
a first fuel supply line;
a second fuel supply line;
a third fuel supply line extending from the fuel tank to a junction of the first, second, and third fuel supply lines;
a main pump that delivers fuel from the fuel tank to the combustor, wherein the first fuel supply line extends from the junction to an inlet of the main pump;
a motive pump that delivers fuel from the fuel tank to the actuator, thereby providing pumped fuel which provides actuation power for the actuator, and then to the main pump, wherein the second fuel supply line extends from the junction to an inlet of the motive pump;
an ejector within the fuel tank that receives fuel from the motive pump to move fuel within the fuel tank;
a valve fluidly disposed between the ejector and the motive pump to maintain minimum fuel pressure to the actuator;
an actuator supply line fluidly connecting the motive fuel pump to an inlet of the actuator; and
an actuator return line fluidly connecting an outlet of the actuator to the first fuel supply line.

19. The gas turbine engine system of claim 18 and further comprising:
a boost pump that pumps fuel from the fuel tank to the main pump and the motive pump, wherein the boost pump is fluidly connected between the fuel tank and the junction along the third fuel supply line.

20. The gas turbine engine system of claim 18 and further comprising:
a manifold supply line fluidly connecting an outlet of the main pump to the combustor;
a distribution system fluidly connected between the combustor and the main pump along the manifold supply line, the distribution system comprising:
a fuel manifold that receives fuel from the main pump; and
a plurality of valves that deliver fuel from the fuel manifold to a plurality of fuel nozzles for combustion within the combustor;
a main pump return line fluidly connecting the manifold supply line to the first fuel supply line;
a fuel/oil heat exchanger fluidly connected between the boost pump and the main pump along the first fuel supply line;
wherein the actuator return line fluidly connects the outlet of the actuator to the first fuel supply line downstream of the fuel/oil heat exchanger, and wherein the actuator regulates an airflow within the gas turbine engine system;
a regulating valve fluidly connected along the main pump return line, and
a plurality of partitions within the fuel tank, wherein the ejector circulates fuel between at least two of the plurality of partitions.

* * * * *